(12) United States Patent
Eldefrawy et al.

(10) Patent No.: US 10,867,053 B2
(45) Date of Patent: Dec. 15, 2020

(54) CREATING SOFTWARE PACKAGES FOR PERFORMING SECURE COMPUTATIONS

(71) Applicant: SRI International, Menlo Park, CA (US)

(72) Inventors: Karim Eldefrawy, Palo Alto, CA (US); Tancrede Lepoint, Jersey City, NJ (US)

(73) Assignee: SRI International, Menlo Park, CA (US)

( * ) Notice: Subject to any disclaimer, the term of this patent is extended or adjusted under 35 U.S.C. 154(b) by 116 days.

(21) Appl. No.: 16/382,001

(22) Filed: Apr. 11, 2019

(65) Prior Publication Data
US 2019/0392155 A1   Dec. 26, 2019

Related U.S. Application Data

(60) Provisional application No. 62/690,299, filed on Jun. 26, 2018.

(51) Int. Cl.
*G06F 21/60* (2013.01)
*H04L 29/06* (2006.01)
(Continued)

(52) U.S. Cl.
CPC ........... *G06F 21/602* (2013.01); *G06F 17/18* (2013.01); *H04L 9/3247* (2013.01);
(Continued)

(58) Field of Classification Search
CPC .......... G06F 21/602; G06F 17/18; G06F 8/30; G06F 8/60; H04L 63/0428; H04L 9/3247;
(Continued)

(56) References Cited

U.S. PATENT DOCUMENTS 4,348,740 A   9/1982   White
8,572,405 B2   10/2013   Kerschbaum
(Continued)

OTHER PUBLICATIONS

Barak et al., "An End-to-End System for Large Scale P2P MPC-as-a-Service and Low-Bandwidth MPC for Weak Participants," ACM CCS 2018, Aug. 22, 2018, 42 pp.

*Primary Examiner* — Michael R Vaughan
(74) *Attorney, Agent, or Firm* — Shumaker & Sieffert, P.A.

(57) ABSTRACT

This disclosure is related to devices, systems, and techniques for automatically generating software packages to provide Secure Computation as a Service (SCaaS). For example, a computing device includes processing circuitry configured to receive a set of information comprising an indication of a first party and an indication of a second party. Additionally, the processing circuitry is configured to generate, based on the set of information, a first software package corresponding to the first party, the first software package configured to implement a secure computation, and generate, based on the set of information, a second software package corresponding to the second party, the second software package configured to implement the secure computation. Additionally, the processing circuitry is configured to export the first software package and export the second software package, enabling the first party device and the second party device to perform the secure computation.

20 Claims, 8 Drawing Sheets

(51) Int. Cl.
  *H04L 9/32* (2006.01)
  *G06F 17/18* (2006.01)
  *G06F 8/30* (2018.01)
  *G06F 8/60* (2018.01)

(52) U.S. Cl.
  CPC ............ *H04L 63/0428* (2013.01); *G06F 8/30* (2013.01); *G06F 8/60* (2013.01); *H04L 2209/08* (2013.01); *H04L 2209/46* (2013.01)

(58) Field of Classification Search
  CPC ............ H04L 2209/08; H04L 2209/46; H04L 2209/38; H04L 2209/56; H04L 9/3239
  See application file for complete search history.

(56) References Cited

U.S. PATENT DOCUMENTS

| | | | |
|---|---|---|---|
| 8,954,732 B1* | 2/2015 | Watsen | H04L 63/0823 713/157 |
| 9,275,237 B2 | 3/2016 | De Cristofaro et al. | |
| 9,652,512 B2 | 5/2017 | Litherland et al. | |
| 9,916,233 B1* | 3/2018 | Qureshi | G06F 9/45533 |
| 2007/0239705 A1 | 10/2007 | Hunt et al. | |
| 2009/0006855 A1 | 1/2009 | Tuyls et al. | |
| 2009/0282039 A1 | 11/2009 | Diamond | |
| 2013/0010950 A1 | 1/2013 | Kerschbaum | |
| 2014/0325230 A1 | 10/2014 | Sy et al. | |
| 2015/0149763 A1 | 5/2015 | Kamara | |
| 2017/0351868 A1* | 12/2017 | Jacob | G06F 21/602 |
| 2018/0032706 A1* | 2/2018 | Fox | G06F 8/60 |
| 2018/0212971 A1* | 7/2018 | Costa | H04L 9/0861 |

\* cited by examiner

Service Selection (1) Select your Service:

○ Polynomial Evaluation

402A

○ Secure Pattern Matching

402B

○ Set Intersection

402C

○ Path Evaluation

402D

● Linear Regression

402E

○ Logistic Regression

402F

[ Next Step! ] 404

CREATING SOFTWARE PACKAGES FOR PERFORMING SECURE COMPUTATIONS

This application claims the benefit of U.S. Provisional Patent Application No. 62/690,299, filed Jun. 26, 2018, the entire content of which is incorporated herein by reference.

TECHNICAL FIELD

This disclosure is related to secure multi-party computation.

BACKGROUND

Secure multi-party computation may enable parties to jointly compute a function based on a set of inputs while keeping the set of inputs private. For example, a first device in possession of a first set of data and a second device in possession of a second set of data may jointly compute a function using the first set of data and the second set of data, without revealing at least a subset of the first set of data to the second device and without revealing at least a subset of the second set of data to the first device.

SUMMARY

In general, the disclosure is directed to devices, systems, and techniques for creating software packages for performing secure computations. More specifically, an example computing device may implement secure multi-party computation by generating software packages and exporting the software packages to party devices that are participants in a secure computation, enabling the party devices to perform the secure computation using the software packages. The computing device, in some examples, may generate the software packages based on a set of information received from a first party device. In other words, the computing device may generate the software packages to perform the secure computation according to one or more specifications or parameters indicated in the set of information provided by the first party device. In this way, the computing device may perform Secure Computation as a Service (SCaaS) by generating software for performing the secure computation according to specifications and parameters indicated by a party that participates in the secure computation.

In some examples, the computing device may generate a first software package corresponding to the first party device and a second software package corresponding to a second software device. The set of information—received, in some cases, from the first party device—may represent parameters and specifications, where the computing device generates the first software package and the second software package to perform the secure computation according to the parameters and specifications. For example, the set of information may include an indication of the second party device, causing the computing device to create software packages for performing the secure computation between the first party device and the second party device. Additionally, in some examples, the set of information may further include an indication of a third-party device, causing the computing device to create three separate software packages for performing the secure computation between the first party device, the second party device, and the third-party device. In this way, the computing device may generate the software packages to perform the secure computation between the parties indicated in the set of information provided by the first party device. After generating the software packages, the computing device may output the software packages to the respective computing devices.

Additionally, or alternatively, in some examples, the set of information may include parameters corresponding to respective inputs of the software packages, and respective outputs produced by the secure computation using the software packages. For example, the set of information may include a format of inputs to the secure packages and a type of output (e.g., an intersection data set, a linear model, or a pattern) to be produced by the secure computation. The set of information may also include one or more security provisions to be included in the software packages and an indication of whether the computing device is authorized to assist in performing the secure computation. By generating the software packages based on the set of instructions, the computing device may improve an efficiency in which the secure computations are performed, increase a variety of secure computations available to be performed, decrease a time required for performing secure computations, or any combination thereof.

In some examples, a computing device is configured to automatically generate software packages to provide SCaaS, the computing device including processing circuitry electrically coupled to a storage device. The processing circuitry is configured to receive a set of information including an indication of a first party and an indication of a second party, generate, based on the set of information, a first software package corresponding to the first party, the first software package configured to implement a secure computation, generate, based on the set of information, a second software package corresponding to the second party, the second software package configured to implement the secure computation, export the first software package to a first party device associated with the first party, and export the second software package to a second party device associated with the second party, enabling the first party device and the second party device to perform the secure computation using the first software package and the second software package. To perform the secure computation, the first software package and the second software package are configured to accept as an input a first set of data associated with the first party, and accept as an input a second set of data associated with the second party. Additionally, to perform the secure computation, the first software package and the second software package are configured to enable the first party device and the second party device to exchange, over a communication link between the first party device and the second party device, information including at least one of an encoded version of the first set of data and an encoded version of the second set of data, where there is no revelation of at least a subset of the second set of data to the first party and no revelation of at least a subset of the first set of data to the second party.

In some examples, a method includes receiving, by processing circuitry of a computing device for automatically generating software packages to provide SCaaS, a set of information including an indication of a first party and an indication of a second party, generating, based on the set of information, a first software package corresponding to the first party, the first software package configured to implement a secure computation, generating, based on the set of information, a second software package corresponding to the second party, the second software package configured to implement the secure computation, exporting the first software package to a first party device associated with the first party, and exporting the second software package to a second party device associated with the second party, enabling the first party device and the second party device to perform the secure computation using the first software package and the second software package. To perform the secure computation, the method further includes accepting, by the first software package and the second software package, a first set of data associated with the first party as an input, accepting, by the first software package and the second software package, a second set of data associated with the second party as an input, and exchanging, over a communication link between the first party device and the second party device, information including at least one of an encoded version of the first set of data and an encoded version of the second set of data, where there is no revelation of at least a subset of the second set of data to the first party and no revelation of at least a subset of the first set of data to the second party.

In some examples, a computing device is configured to automatically generate a set of software packages in order to provide SCaaS to two or more parties, enabling the two or more parties to perform a secure computation using the set of software packages to produce an output, where the computing device includes processing circuitry electrically coupled to a storage device. The processing circuitry is configured to receive a set of information including: an indication that a first party and a second party are to be involved in the secure computation, a format of a first set of data associated with the first party, a format of a second set of data associated with the second party, a type of secure computation to be performed, a list of devices that are authorized to access the output, one or more security provisions to be included in the secure computation, and an indication of whether the processing circuitry is authorized to assist in performing the secure computation, where the set of information enables a selection of whether to prioritize decreasing an amount of time required to perform the secure computation or to prioritize increasing a security level of the secure computation. Additionally, the processing circuitry is configured to generate, based on set of information, a first software package corresponding to the first party, the first software package configured to implement the secure computation, generate, based on set of information, a second software package corresponding to the second party, the second software package configured to implement the secure computation, export the first software package to a first party device associated with the first party, and export the second software package to a second party device associated with the second party, enabling the first party device and the second party device to perform the secure computation using the first software package and the second software package. To perform the secure computation, the first software package and the second software package are configured to accept as an input the first set of data associated with the first party, accept as an input the second set of data associated with the second party, and enable the first party device and the second party device to verify that the first software package and the second software package originate from the processing circuitry of the computing device, exchange, over a communication link between the first party device and the second party device, information including at least one of an encoded version of the first set of data and an encoded version of the second set of data, perform, based on the exchange of the information, the secure computation to produce the output, where there is no revelation of at least a subset of the second set of data to the first party and no revelation of at least a subset of the first set of data to the second party, and gain access to the output based on the list of devices.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
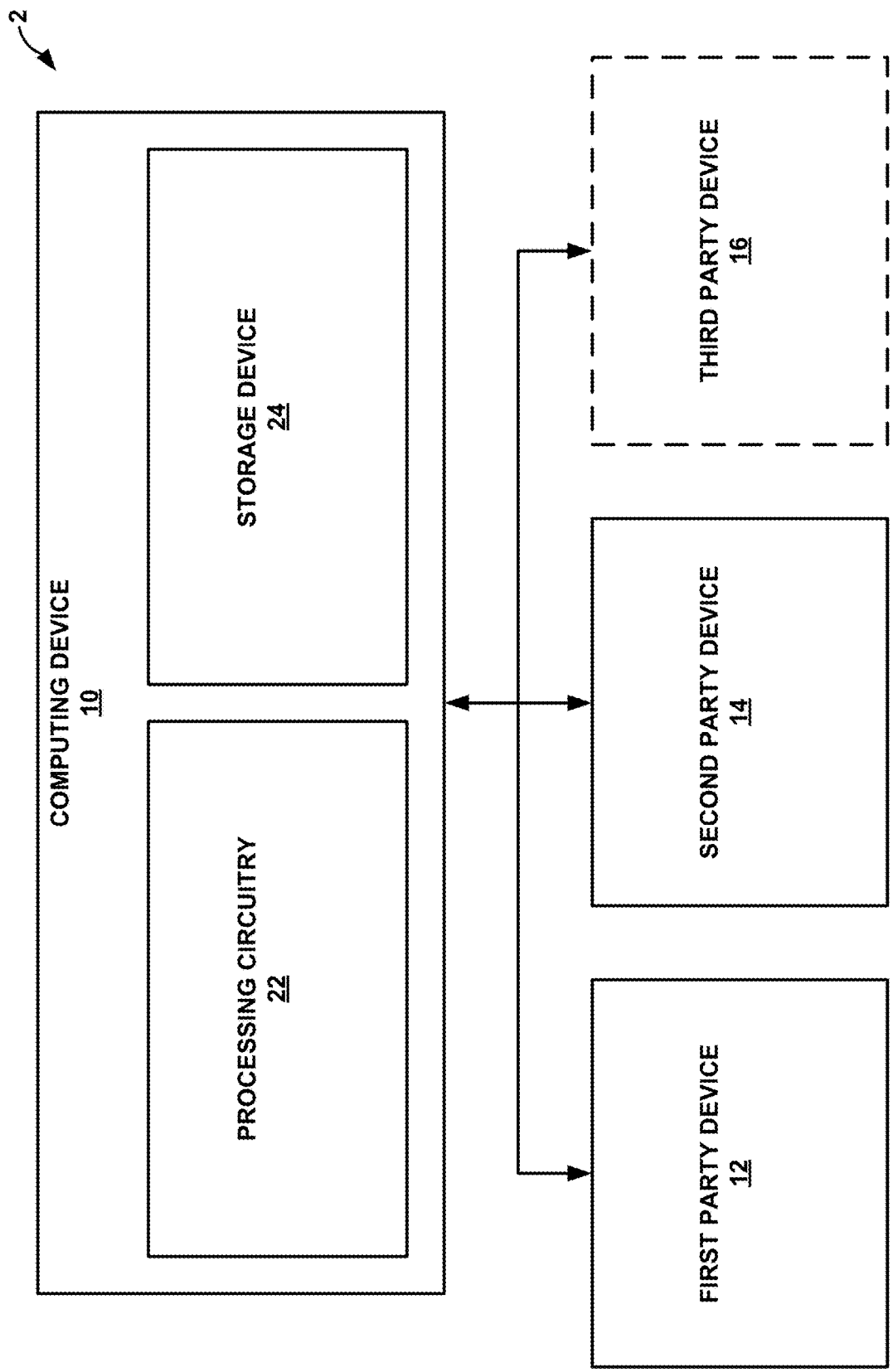
FIG. 1 is a block diagram illustrating an example system, in accordance with one or more techniques of this disclosure.

This disclosure is directed to devices, systems, and techniques for providing usable, verifiable, and efficient Secure Computation as a Service (SCaaS) to two or more parties using a computing device. For example, the computing device may enable two or more party devices (e.g., servers, laptop computers, desktop computers, smart phones, or tablets) associated with two or more respective parties to provide login information to a web-interface, or portal, or an application, or an Application Programming Interface (API). Additionally, the computing device may receive a set of information including a specification of a type of computation to be performed. In some examples, the specification of the computation represents a user selection from a set of available computations. Additionally, in some examples, the set of information includes a computer code, where the computing device automatically generates, based on the computer code, software packages for performing the secure computation. The set of information may also include a format of the input data, (e.g., a database, raw files, streaming data, or remotely accessible data). The set of information may include a specification of what outputs are exactly revealed from the performed computation, and to which parties such computation is to be revealed (i.e., selective disclosure of outputs). Parties can also specify the security guarantees that are required by the secure computation, e.g., is privacy the only concern, or is modification of software of participating parties also a concern.

In some examples, one or more of the parties can also specify performance and/or auxiliary requirements, e.g., is it acceptable for the computation to take hours, or is speed important, fast computation may have limitations in terms of data size; another auxiliary requirement could be that the computation is assisted by one of the SCaaS servers, in that case, such a SCaaS server acts as a trusted intermediary that can generate parameters and randomness required to speed up the computation. The SCaaS servers may assist in evaluating the function. In other examples, the data inputs are not sent to the SCaaS servers.

SCaaS (e.g., cloud) infrastructure may take such requirements and prepare a per-user/party software packages (e.g., a Docker container image, or images in other similar frameworks, or a virtual machine) that may implement the required secure computation, and interface to the other parties. Such software packages may be generated automatically. In some examples, the software packages may be digitally signed. Furthermore, the software packages may be generated in a verified manner (e.g., the software that is automatically produced is guaranteed to satisfy certain properties, such as no memory leaks or buffer overflows), or in such a way that it has minimal required additional code to reduce its memory footprint and improve its running speed.

The software packages are then sent to each respective party device. Subsequently, the party devices may load the software packages in infrastructure (e.g., virtual infrastructure or physical infrastructure) configured to run the software packages. The secure computation proceeds between these software packages deployed at all party device infrastructure. Once the secure computation is completed, the output may be revealed to the party devices that are indicated in the set of information.

Further, this disclosure describes a system and methods that enable two or more parties to perform secure (e.g., distributed) computations with privacy-guarantees on their data without revealing their data. In some examples, the system is automated, it generates packaged secure computation code/executables using a cloud infrastructure, real-time on demand customization of the secure computation code/executables and can perform verifiable composition of packaged secure computation code/executables using a cloud infrastructure.

FIG. 1 is a block diagram illustrating example system 2, in accordance with one or more techniques of this disclosure. As seen in FIG. 1, system 2 includes computing device 10, first party device 12, second party device 14, and third party device 16. Additionally, computing device 10 includes processing circuitry 22 and storage device 24.

Computing device 10 may be configured to automatically generate a set of software packages in order to provide SCaaS to two or more parties, enabling the two or more parties to perform a secure computation using the set of software packages to produce an output. In this way, computing device 10 may represent a "SCaaS server" which can facilitate secure computation by generating the set of software packages. For example, computing device 10 may provide SCaaS to any two or more of first party device 12, second party device 14, third party device 16 (collectively, "party devices 12, 14, 16"), and additional party devices not illustrated in FIG. 1. In some examples, computing device 10 automatically generates the set of software packages based on a set of information provided by at least one of party devices 12, 14, 16. As such, the party device that provides the set of information may cause computing device 10 to generate the set of software packages that enable any two or more of party devices 12, 14, 16 to perform a secure computation, the secure computation being customized according to the set of information provided by at least one of party devices 12, 14, 16.

Computing device 10 includes processing circuitry 22. Processing circuitry 22, in one example, may include one or more processors that are configured to implement functionality and/or process instructions for execution within computing device 10. For example, processing circuitry 30 may be capable of processing instructions stored in memory 40. Processing circuitry 30 may include, for example, microprocessors, digital signal processors (DSPs), application specific integrated circuits (ASICs), field programmable gate arrays (FPGAs), or equivalent discrete or integrated logic circuitry, or a combination of any of the foregoing devices or circuitry. Accordingly, processing circuitry 30 may include any suitable structure, whether in hardware, software, firmware, or any combination thereof, to perform the functions ascribed herein to processing circuitry 30.

Additionally, computing device 10 includes storage device 24. Storage device 24 may be configured to store information within computing device 10 during operation. Storage device 24 may include a computer-readable storage medium or computer-readable storage device. In some examples, storage device 24 includes one or more of a short-term memory or a long-term memory. Storage device 24 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage device 24 is used to store data indicative of instructions for execution by processing circuitry 22.

Party devices 12, 14, 16 may, in some cases, represent devices that include computer hardware. Additionally, or alternatively, in some cases, party devices 12, 14, 16 include any combination of Virtual machines (VMs), containers, pods, and virtual agents.

In order to generate software packages such that party devices 12, 14, 16 are able to perform a custom secure computation, in some cases, computing device 10 receives, from first party device 12 associated with a first party, a set of information. Additionally, or alternatively, in some cases, computing device 10 receives the set of information from second party device 14, third party device 16, or another device not illustrated in FIG. 1. The set of information may include any combination of an indication that the first party and a second party are to be involved in the secure computation, a format of a first set of data associated with the first party, a format of a second set of data associated with the second party, a type of secure computation to be performed, a list of devices that are authorized to access the output, one or more security provisions to be included in the secure computation, and an indication of whether the processing circuitry is authorized to assist in performing the secure computation. The set of information may affect one or more aspects of the secure computation performed by party devices 12, 14, 16 using the software packages generated by computing device 10.

For example, based on the set of information, computing device 10 may determine how many parties are involved in the secure computation, determine which type(s) of secure computation are performed, and determine which type(s) of output are produced by the secure computation. In some examples, computing device 10 produces software packages based on the set of information such that the secure computation includes an intersection computation between the first set of data and the second set of data, where the output includes an intersection data set resulting from the intersection computation. In some examples, computing device 10 produces software packages based on the set of information such that the secure computation includes a linear regression computation based on the first set of data and the second set of data, where the output includes a linear model resulting from the linear regression computation. Additionally, in some examples, computing device 10 produces software packages based on the set of information such that the secure computation includes a pattern matching computation based on the first set of data and the second set of data, where the output includes a pattern resulting from the pattern matching computation.

In some examples, computing device 10 generates the software packages using a library of software engines stored in storage device 24. For example, the library of software engines may include a software engine corresponding to each type of secure computation (e.g., set intersection, linear regression, and logistic regression), each valid number of parties to participate in the secure computation (e.g., two or more), each format of input data, and other elements of the set of information. Software engines may include computer code written in any combination of a set of programming languages including Java, JavaScript, python, C, and C++. Computing device 10 may receive the set of information from computing device 12, where the set of information represents a selection (e.g., a user selection) from the library of software engines. Computing device 10 may generate the software packages based on the selection from the set of software engines. Additionally, or alternatively, in some examples, computing device 10 generates the software packages using software provided by party devices 12, 14, 16 in the set of information. In other words, party devices 12, 14, 16 may supply computer code to computing device 10 for generating the software packages.

In some examples, based on the set of information, computing device 10 may determine whether to whether to prioritize decreasing an amount of time required to perform the secure computation or to prioritize increasing a security level of the secure computation. For example, as discussed above, the set of information may include an indication that processing circuitry 22 is authorized to assist in performing the secure computation or an indication that processing circuitry 22 is not authorized to assist in performing the secure computation. If processing circuitry 22 is authorized to assist in the secure computation, an amount of time required to perform the secure computation may be lower than an amount of time required to perform the secure computation if processing circuitry 22 is not authorized to assist in performing the secure computation. Additionally, if processing circuitry 22 is authorized to assist in the secure computation, a security level of the secure computation may be lower than a security level of the secure computation if processing circuitry 22 is not authorized to assist in performing the secure computation.

In some examples, allowing processing circuitry 22 to assist in the secure computation may expose data from the party devices 12, 14, 16 to computing device 10. For example, based on processing circuitry 22 being authorized to assist in performing the secure computation, the first software package and the second software package may be configured to enable first party device 12 and second party device 14 to exchange at least one of an encoded version of a first set of data and an encoded version of a second set of data with computing device 10, where there is no revelation of at least a subset of the first set of data to computing device 10 and no revelation of at least a subset of the second set of data to computing device 10. To assist in performing the secure computation, computing device 10 may be configured to generate one or more random parameters in order to decrease an amount of time required to perform the secure computation.

Additionally, in some examples, based on processing circuitry 22 being authorized to assist in performing the secure computation, processing circuitry 22 is configured to generate a set of random data, export a first subset of the set of random data to first party device 12, and export a second subset of the set of random data to second party device 14, wherein the first subset and the second subset enable first party device 12 and second party device 14 to decrease an amount of time required to perform the secure computation.

Processing circuitry 22 may generate, based on the set of information, a first software package corresponding to the first party, the first software package configured to implement a secure computation. Additionally, processing circuitry 22 may generate, based on the set of information, a second software package corresponding to the second party, the second software package configured to implement the secure computation. As such, the first software package and the second software package may, in some examples, together implement the secure computation. Subsequently, processing circuitry 22 may export the first software package to first party device 12 and processing circuitry 22 may export the second software package to second party device 14 associated with the second party. As such, computing device 10 may enable first party device 12 and second party device 14 to perform the secure computation using the first software package and the second software package.

In some examples, to perform the secure computation, the first software package and the second software package are configured to accept as an input the first set of data associated with the first party and accept as an input the second set of data associated with the second party. The first set of data and the second set of data may, in some cases, be stored in storage devices corresponding to first party device 12 and second party device 14, respectively. Additionally, to perform the secure computation, the first software package and the second software package may be further configured to enable first party device 12 and second party device 14 to verify that the first software package and the second software package originate from the processing circuitry of the computing device. After the verification, first party device 12 and second party device 14 may exchange, over a communication link between the party device 12 and second party device 14, information including at least one of an encoded version of the first set of data and an encoded version of the second set of data and perform, based on the exchange of the information, the secure computation to produce the output.

At least some of the first set of data and the second set of data may represent privileged or confidential information. As such, computing device 10 may generate the first software package and the second software package such that the first software package and the second software package, wherein there is no revelation of at least a subset of the second set of data to the first party and no revelation of at least a subset of the first set of data to the second party. Additionally, in some examples, the first software package and the second software package may enable the correct devices to gain access to the output based on the list of devices provided by first party device 12 as a part of the set of information.

Although computing device 10 may enable two party devices (e.g., first party device 12 and second party device 14 to perform a secure computation, in some examples, computing device 10 enables three party devices to perform a secure computation. For example, in addition to generating a first software package corresponding to first party device 12 and a second software package corresponding to second party device 14, computing device 10 may generate, based on a set of information provided by first party device 12, a third software package corresponding to a third party. Subsequently, computing device 10 may export the third software package to third party device 16 associated with the third party, enabling first party device 12, second party device 14, and third party device 16 to perform a second secure computation using the first software package, the second software package, and the third software package. In some examples, the second secure computation is a separate computation from the first secure computation between first party device 12 and second party device 14.

Additionally, in some cases, computing device 10 may enable more than three party devices to perform a secure computation. For example, a set of information provided by first party device 12 may include an indication of at least one additional party (not illustrated in FIG. 1) in addition to alternatively to first party device 12, second party device 14, and third party device 16. Computing device 10 may generate, based on the set of information, an additional software package corresponding to each additional party of the at least one additional party. Subsequently, computing device 10 may export each additional software package to a respective additional party, enabling the first party device, the second party device, the third party device, and devices corresponding to the at least one additional party to perform a third secure computation using the first software package, the second software package, the third software package, and each additional software package.

In some examples, one or more techniques described herein include a cloud-assisted service that allows users to perform a simple user-friendly process including automated generation of packaged secure computation code/executables using a cloud infrastructure, verified generation of high assurance software for secure computation, real-time on demand customization of the secure computation code/executables, and verifiable composition of packaged secure computation code/executables using a cloud infrastructure.

An example application of one or more devices, systems, and techniques described herein include using secure computation for cryptocurrency risk assessment and analysis. This may enable users and organizations to quickly and cost effectively perform secure computation with minimal cost and complexity without a need for experts in cryptography and security to participate in the secure computation. For example, system 2 may enable applications that were not possible before.

In some examples, the following notation may be used to describe systems, devices, and techniques for providing SCaaS and performing secure computation.

Pi: a party (number i) requesting the service, i.e., the party Pi wants to perform secure computation with its data with another party, Pj, that uses its own data. Both parties might not want to reveal at least some of their data to each other. For example, first party device 12 may correspond to a first party (Pi) and second party device 14 may correspond to a second party (Pj)

S: the SCaaS service provider infrastructure, i.e., the servers that enable Pi and Pj to perform secure computation by preparing software that they can run. Computing device 10 may be an example of the SCaaS service provider infrastructure (S).

Fn: computation number n to be performed, assuming the two parties want to perform multiple unrelated computations on different datasets, they could all be lumped into one large computation that has several steps, each with a different dataset. In some examples, first party device 12 and second party device 14 may perform secure computation (Fn) using a first software package and a second software package generated by computing device 10.

Dn,i: input data of Pi for Fn. In other words, Dn,i may represent the first set of data associated with the first party Pi.

On,i: output data for Pi from Fn. In other words, On,i may represent the output of the secure computation, where On,i is accessible by first party device 12.

Details of the steps of an example operation for a generic function to be computed and denoted by Fn are outlined below. In the sections below, example concrete use cases for such Fn are described. Example steps of specifying and preparing software packages for performing a secure computation are described below.

Pi may engage in a secure computation with Pj, e.g., compare their databases and find common entries, or one party wants to search another party's data for specific strings without revealing what such strings are, the other party does not want to reveal what the non-matching data is. The computation to be performed is Fn. To set up a desired secure computation, first party device 12 associated with first party (Pi) may prepare a set of information that includes one or more parameters associated with the desired secure computation and export the set of information to computing device 10. Computing device 10 may receive the set of information and generate software packages based on the set of information. The set of information, in some examples, includes one or more parameters discussed in further detail below.

Pi may log into the SCaaS portal (via a web interface or an application on a PC or mobile device or API) and may specify other parties (Pj) by specifying their email, specifying other means of identification, or selecting them from the parties already registered in the system, for example. In other words, computing device 10 may receive login information from first party device 12. In turn, computing device 10 may verify first party device 12. The set of information received by computing device 10 from first party device 12 may include a list of parties participating in the secure computation. In some examples, the list of parties includes the first party, a second party associated with second party device 14, a third party associated with third party device 16, another party associated with a device not illustrated in FIG. 1, or any combination thereof.

The set of information may include an indication, from the first party (Pi), of a type of secure computation to be performed, e.g., a 2-party computation, or a computation that involves 3+ parties. Additionally, the set of information may include an indication of whether the secure computation should be completely peer-to peer between the listed parties, or whether the parties are willing to use the assistance of a SCaaS server (e.g., computing device 10) to bootstrap and speed up the computation. In other words, computing device 10 may receive the set of information which includes an indication, from first party device 12, of a number of parties participating in the secure computation. Additionally, the set of information may include an indication, from first party device 12, of whether computing device 10 is authorized to participate in the secure computation. In this way, first party device 12 may be able to choose to prioritize decreasing an amount of time required to perform the secure computation (e.g., by authorizing computing device 10 to assist in the secure computation), or choose to prioritize increasing a level of security of the secure computation (e.g., by not authorizing computing device 10 to assist in the secure computation, thus keeping data confined to the parties participating in the secure computation).

Pi may specify the exact steps of the secure computation (Fn) to be performed securely, this could be achieved by choosing from a set of available steps, or by supplying a program/code to be automatically converted into a secure computation program. Put another way, the set of information may include a user selection from a set of computation steps stored in storage device 24. Additionally, or alternatively, in some examples, the set of information may include computer code representing one or more steps of the secure computation, and computing device 10 may generate software packages based on the computer code, enabling devices to perform the secure computation (Fn) using the software packages. In some examples, computing device 10 may output the set of available computation steps stored in storage device 24 to first party device 12. In turn, first party device 12 may display the set of computation steps on a user interface, thus enabling first party device 12 to receive a user selection from the set of computation steps, and transmit the user selection to computing device 10 as a part of the set of information.

In some examples, the software packages are configured to enable any combination of first party devices 12, 14, 16 to apply a sequence of mathematical functions to produce the output. For example, the steps specified by the first party in the set of information may include the sequence of mathematical functions. In some examples, the sequence of mathematical functions may include any combination of a summation, a multiplication, a division, matrix algebra, a private set intersection, a secure pattern matching function, a linear regression, a logistic regression, a polynomial evaluation, and a cost function.

Pi may specify a format of the input data (Dn), (e.g., a database format, a raw data file format, a streaming data format, or a remotely accessible data format). This can also be performed by choosing the format from a set of standard formats that appear as options to Pi. In other words, the set of information received by computing device 10 may include a specification of the format of the input data to the secure computation. In this way, computing device 10 may generate software packages to interface with the input data. In some examples, storage device 24 stores a set of input data types, and outputs the set of input data types to first party device 12. First party device 12 may display the set of input data types on a user interface, enabling first party device 12 to receive a user selection from the set of input data types and transmit the user selection from the set of input data types to computing device 10 as a part of the set of information.

Additionally, the first party (Pi) may specify what output(s) (On) are produced by the secure computation and may specify to which parties such output(s) are to be revealed, i.e., selective disclosure of outputs. For example, the set of information may include an indication that the secure computation includes an intersection computation between two or more sets of data (a number of sets depending on how many parties are involved in the secure computation), where the output of the secure computation includes an intersection data set resulting from the intersection computation. Additionally, or alternatively, in some examples, the set of information includes an indication that the secure computation includes a linear regression computation based on two or more sets of data, where the output includes a linear model resulting from the linear regression computation. In some examples, the set of information includes an indication that the secure computation includes a pattern matching computation based on the first set of data and the second set of data, where the output includes a pattern resulting from the pattern matching computation. Since the outputs may include sensitive information, the set of information provided by first party device 12 may include a list of devices that are granted access to the outputs after the secure computation is performed. The list of devices may include any combination of computing device 10, first party device 12, second party device 14, third party device 16, and other devices not illustrated in FIG. 1.

In some cases, the first party (Pi) may also specify security guarantees that are required by the secure computation, e.g., is privacy the only concern (i.e., only provide security against passive eavesdropping adversaries), or is modification of software of participating users/parties also a concern (i.e., provide security against active malicious cheating adversaries/parties). In other words, the set of information received by computing device 10 may include an indication of such security guarantees.

Pi may also specify performance and/or auxiliary requirements, e.g., is it acceptable for the computation to take minutes or even hours or is speed important and computation must be in seconds or less, fast computation may have limitations in terms of maximum data size it can deal with; another auxiliary requirement could be that the computation is assisted by one of the SCaaS servers. As discussed above, the set of information may include an indication of whether computation speed is a priority or whether data security is a priority, the set of information including an indication of whether computing device 10 is authorized to assist in performing the secure computation.

The SCaaS (cloud) infrastructure (S) (e.g., computing device 10) takes such requirements and automatically prepares a per-user/party software packages (e.g., an executable, a (Docker) container image, or a virtual machine) that will implement the required secure computation, and interface to the respective users/parties. Such software packages are generated automatically. The software packages may be generated in a verified manner, or in such a way that the software packages have minimal required additional code in order to reduce a memory footprint and improve a running speed of the respective software packages. In some examples, the software packages include libraries and supporting functions needed in a lightweight container or uni-container. Put another way, computing device 10 may generate a set of software packages based on the set of information received from first party device 12, the set of software packages including a software package corresponding to each party identified in the set of information.

Although computing device 10 is described herein as receiving the set of information from first party device 12, in some cases, computing device 10 receives the set of information from second party device 14, third party device 16, or another device not illustrated in FIG. 1. The device providing the set of information may be associated with the party that is "initiating" the secure computation.

After generating the set of software packages, computing device 10 may deliver the set of software packages to respective party devices, enabling the software packages to be executed in order to perform the secure computation.

For example, the per-user/party software packages are then sent to each user/party and each user/party then loads the respective software packages in virtual (or physical) infrastructure configured to run the software packages. Each party participating in the secure computation may receive a package that is digitally signed by SCaaS provider, S, (e.g., computing device 10) and this signature can be verified. This way, all parties Pi-s may verify they are receiving the software they are supposed to receive and to run. In other words, party devices 12, 14, 16 may verify, based on signatures, that respective software packages originate from computing device 10, which is trusted by party devices 12, 14, 16.

Figure 2:
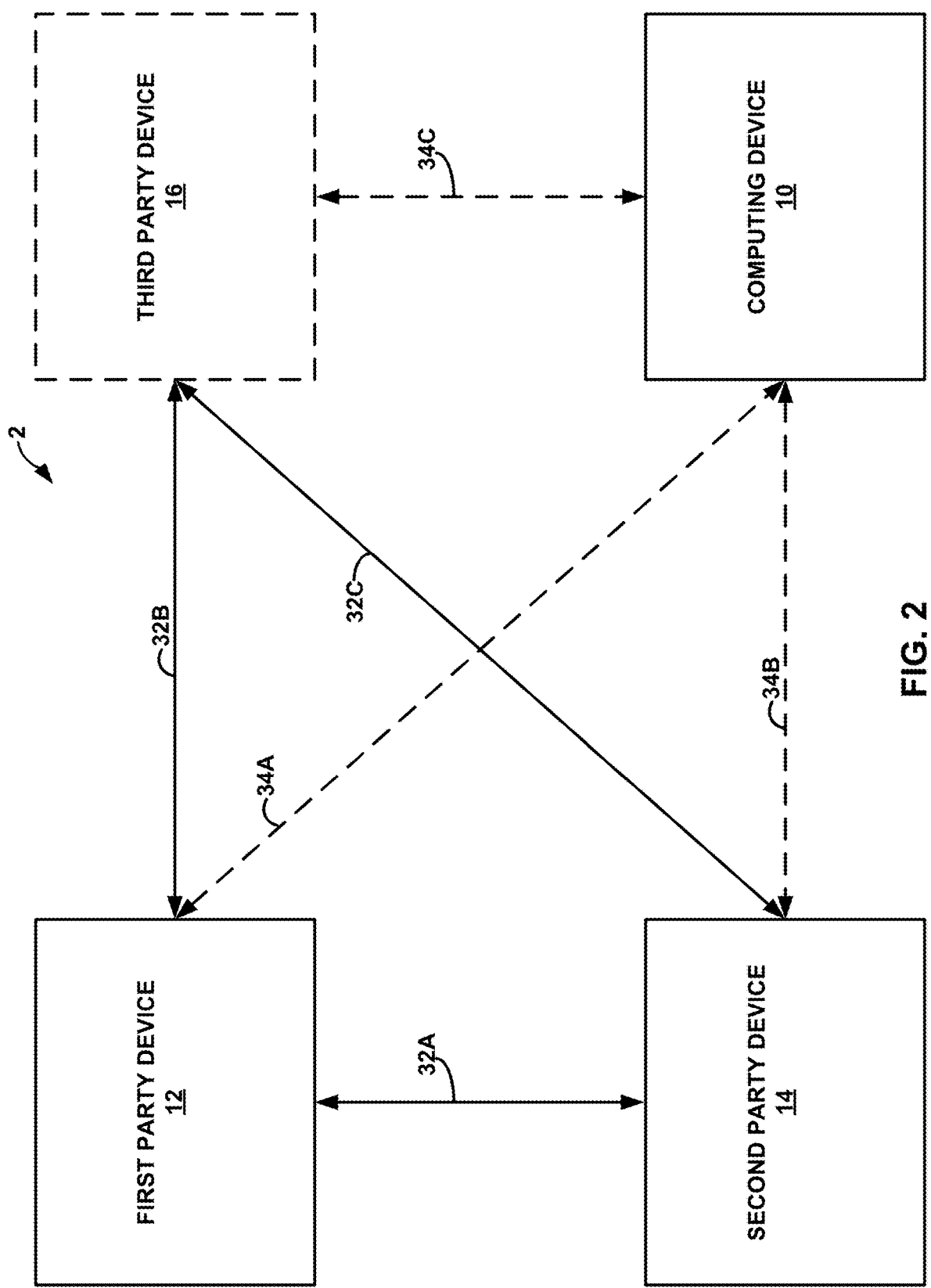
FIG. 2 is a block diagram illustrating the example system of FIG. 1 which is configured to perform a secure computation, in accordance with one or more techniques of this disclosure.

FIG. 2 is a block diagram illustrating example system 2 which is configured to perform a secure computation, in accordance with one or more techniques of this disclosure. As seen in FIG. 2, system 2 includes computing device 10, first party device 12, second party device 14, and third party device 16. Additionally, computing device 10 includes processing circuitry 22 and storage device 24. First party device 12, second party device 14, and third party device 16 are connected by communication links 32A-32C (collectively, "communication links 32"). For example, communication link 32A connects first party device 12 and second party device 14, communication link 32B connects first party device 12 and third party device 16, and communication link 32C connects second party device 14 and third party device 16. Additionally, communication links 34A-34C (collectively, "communication links 34") connect party devices 12, 14, 16 to computing device 10. For example, communication link 34A connects first party device 12 to computing device 10, communication link 34B connects second party device 14 to computing device 10, and communication link 23C connects third party device 16 to computing device 10.

Computing device 10 may generate, based on a set of information, a set of software packages and export the set of software packages to respective party devices, enabling the party devices to perform a secure computation. For example, in a secure computation between first party device 12 and second party device 14, computing device 10 may generate a first software package and a second software package, export the first software package to first party device 12, and export the second software package to second party device 14. The first software package and the second software package may accept as an input a first set of data associated with the first party and accept as an input a second set of data associated with the second party. Additionally, first party device 12 and second party device 14 may be configured to verify that the first software package and the second software package originate from processing circuitry 22 of computing device 10. In some examples, to enable the verification of the first software package and the second software package, computing device 10 is configured to generate a first signature corresponding to the first software package and generate a second signature corresponding to the second software package. Subsequently, computing device 10 is configured to export the first signature to first party device 12 with the first software package, allowing first party device 12 to verify that the first software package originates from processing circuitry 22 of the computing device 10. Additionally, computing device 10 is configured to export the second signature to second party device 14 with the second software package, allowing second party device 14 to verify that the second software package originates from processing circuitry 22 of computing device 10.

In some examples, party devices 12, 14 exchange, over communication link 32A between first party device 12 and second party device 14, information including at least one of an encoded version of the first set of data and an encoded version of the second set of data. The first set of data and the second set of data may, in some cases, be private to the first party and the second party, respectively. After the information exchange, first party device 12 and second party device 14 may perform the secure computation to produce an output using the first software package and the second software package. The first set of data and the second set of data may include sensitive information. As such, there may be no revelation of at least a subset of the second set of data to the first party and no revelation of at least a subset of the first set of data to the second party. In some examples, at least one of first party device 12 and second party device 14 may gain access to the output based on the list of devices provided to computing device 10 as a part of the set of information.

In some examples, three party devices may perform a secure computation. For example, in a secure computation between first party device 12, second party device 14, and third party device 16, computing device 10 may generate a first software package, a second software package, and a third software package (collectively "software packages"). Computing device 10 may export the first software package to first party device 12, export the second software package to second party device 14, and export the third software package to third party device 16. The first software package, the second software package, and the third software package may each accept as an input a first set of data associated with the first party, a second set of data associated with the second party, and a third set of data associated with the third party. Additionally, party devices 12, 14, 16 may be configured to verify that the first software package, the second software package, and the third software package originate from processing circuitry 22 of computing device 10. In some examples, to enable the verification of the first software package, the second software package, and the third software package, computing device 10 is configured to generate a first signature corresponding to the first software package, generate a second signature corresponding to the second software package, and generate a third signature corresponding to the third software package. Subsequently, computing device 10 is configured to export the signatures to the respective party devices 12, 14, 16 with the respective software packages, allowing party devices 12, 14, 16 to verify that the software packages from processing circuitry 22 of the computing device 10.

In some examples, party devices 12, 14, 16 exchange, over any combination of communication links 32A-32C, information including at least one of an encoded version of the first set of data, an encoded version of the second set of data, and an encoded version of the third set of data. The first set of data, the second set of data, and the third set of data (collectively, "the sets of data") may, in some cases, be private to the first party, the second party, and the third party, respectively. After the information exchange, party devices 12, 14, 16 may perform the secure computation to produce an output using the three software packages. The sets of data may include sensitive information. As such, there may be no revelation of at least a subset of the first set of data to the second party and the third party, no revelation of at least a subset of the second set of data to the first party and the third party, and no revelation of at least a subset of the third set of data to the first party and the second party. In some examples, at least one of party devices 12, 14, 16 may gain access to the output based on the list of devices provided to computing device 10 as a part of the set of information.

Communication links 34 may represent communications between party devices 12, 14, 16 and computing device 10. In some examples, communication links 34 enable computing device 10 to exchange information with party devices 12, 14, 16. For example, computing device 10 may export software packages to party devices 12, 14, 16 over communication links 34. Additionally, if computing device 10 is authorized to assist in a particular secure computation, computing device 10 and party devices 12, 14, 16 may exchange information including at least one of an encoded version of the first set of data, an encoded version of the second set of data, and an encoded version of the third set of data. As such, computing device 10 may assist in the secure computation using, for example, the encoded data.

Additionally, computing device 10 may enable a secure computation between any number of parties (Pi). To perform a secure computation, each party (Pi) loads the respective software package in its infrastructure, and executes the software package. The secure computation proceeds between the software packages deployed in all Pi-s infrastructures.

Once the secure computation is completed, an output of the secure computation of Fn is revealed to the designated users/parties (e.g., On,i is delivered to Pi).

Several use cases are outlined below. For example, concrete use cases for one or more secure computations (Fn) are described. Additionally, many other use cases may be inferred from the use cases below. Such concrete use cases may include using computing device 10 to facilitate a secure computation between two or more parties. In some examples, the two or more parties may include any combination of a law enforcement agency, a transportation company (e.g., an airline, a rail transportation company, or a bus company), a financial institution, a user associated with a smart contract, a medical facility, and a company performing research using medical data.

SCaaS, in some cases, may be implemented to search airline passenger lists. For example, a law enforcement, or other government agency, may like to ensure that certain individuals are not on incoming or outgoing flight passenger lists. Due to privacy concerns and to comply with privacy laws, airlines may be restricted from sharing entire passenger lists with law enforcement agencies. In other words, an airline may prefer to conceal at least a portion of a passenger list from other parties such as a law enforcement agency. Additionally, the law enforcement agency may desire not to reveal at least some of the identities of the individuals they are searching for because of security (or also privacy) concerns. In this case, the law enforcement agency effectively would like to find out if the entries (which may contain names, passport numbers, dates of birth) in its set containing individuals of interest (set1) appear on any of the passenger lists of a certain airline (set2).

This task can be cast as a set intersection computation between the two sets set1 and set2. Computing device 10, in some cases, may generate software packages for performing a secure set intersection computation which accepts set1 and set2 as inputs. In the case of set intersection between two parties, the input to the computation from each side will be the parties' corresponding data sets (e.g., set1 and set2). In some examples, the output is available to both parties (e.g., the airline and the law enforcement agency). Additionally, in some examples, the output is available to only one party (e.g., the law enforcement agency). The output, for example, is a set of entries that are present in both of set1 and set2, e.g., the people of interest to the law enforcement agency that are registered as passengers on the airline. In other words, a device associated with the law enforcement agency and a device associated with the airline may perform the secure set intersection computation to produce an output intersection data set. The output intersection data set may be made available to any combination of the airline and the law enforcement agency.

Secure intersection computations may also be extended to involve more than two parties. For example, each party of the more than two parties may be associated with a data set. The set intersection in this case could be defined as the entries common to all data sets, or as the entries contained in at least a given number of sets.

In examples where a secure set intersection computation includes two parties (e.g., P1 and P2) each associated with a set of data (e.g., set1 and set2, respectively), steps of operation in the secure set intersection computation include steps described in further detail below.

P1 (a law enforcement agency) may engage in a secure computation with P2 (an airline), e.g., compare their databases and find common entries. The secure set intersection computation to be performed may be denoted as Intersect (set1, set2).

In some examples, either the law enforcement agency (P1) or the airline (P2) may initiate the secure computation. For example, the "initiating" party (e.g., either P1 or P2) may log into the SCaaS portal (via a web interface or an application on a PC or mobile device or an API) and specify the other party (e.g., P1 or P2) by specifying an identity, email, or other means of identification. In some examples, the initiating party may select the other party from a list of parties already registered in the system. Computing device 10, in some cases, may include the "SCaaS portal." In this way, computing device 10 may receive, from a device associated with an initiating party (e.g., first party device 12 or second party device 14), login credentials. Based on the login credentials, computing device 10 may verify the initiating party. Subsequently, computing device 10 may receive a set of information, from the initiating party, that includes an indication of another party participating in the secure set intersection computation.

The initiating party (e.g., P1 or P2) may choose the type of secure computation to be performed, (i.e., a 2-party set intersection). Additionally, the initiating party may indicate whether the secure computation is completely peer-to-peer between P1 and P2, or whether the parties are willing to use the assistance of a SCaaS server to bootstrap and speed up the computation. For example, the set of information provided by the initiating party may include a selection of the type of secure computation and an indication of whether computing device 10 is authorized to assist in the secure computation The initiating party (e.g., P1 or P2) may specify one or more steps of the computation (e.g., Intersect(set1, set2)) to be performed securely. Such a specification may include a selection from a set of available steps, or by an inclusion of a program/code (e.g., written in a computer code language) to be automatically converted into a secure computation program. Intersect(set1, set2) may be coded in different ways, for example, Intersect(set1, set2) may be computed by converting the entries in set1 and set2 of P1 and P2, respectively, to integer values, and then subtracting each of the entries from set1 from each of entries in set2, i.e., assuming that each set1 has n1 entries and set2 has n2 entries, there will be n1*n2 outputs. If an output is 0, then this means that this entry was in both sets. From the index of the entry, one can know which entry in set1 this corresponds to, i.e., taking the remainder of the division of the index by n1, one knows the exact entry number in set1 this was. In other words, the set of information provided by the initiating party may include selections and/or provisions of one or more steps of the secure computation, for example subtracting each interval value of set1 from each integer value of set2.

Additionally, the initiating party (e.g., P1 or P2) may select a format of the input data (e.g., Dn). For example, in the case where an intersection computation is being performed between data sets including an airline passenger list and a law enforcement agency watch list, the format of the data sets may be a "database" format. In some examples, the initiating party may select the format from a set of standard formats that appear as options to the initiating party. For example, computing device 10 may store the set of standard formats in storage device 24, and computing device 10 may export data indicative of the set of standard formats to a device associated with the initiating party (e.g., first party device 12 or second party device 14), enabling the respective device to receive a user input indicative of the format selection. Subsequently, the respective device may send the selection of the format to computing device 10 as a part of the set of information.

In some examples, the initiating party (e.g., P1 or P2) specifies what outputs (On) are exactly revealed from the performed computation, and to which parties such computation is to be revealed. In some examples in which a secure set intersection computation is performed between an airline and a law enforcement agency, only the law enforcement agency is able to learn an output (On) from including a list of entries in set1 that are also present in set2. Such a specification of which parties may access the output may also be included in the set of information provided by the initiating party.

The initiating party (e.g., P1 or P2) can also specify one or more security guarantees that are to be included in the secure computation, e.g., is privacy the only concern (i.e., only provide security against passive eavesdropping adversaries), or is modification of software of participating users/parties also a concern (i.e., provide security against active malicious cheating adversaries/parties). The set of information provided to computing device 10 by the initiating party may also include the one or more security guarantees.

The initiating party (e.g., P1 or P2) may also specify performance and/or auxiliary requirements, e.g., is it acceptable for the computation to take minutes or even hours or is speed important and computation must be in seconds or less, fast computation may have limitations in terms of maximum data size it can deal with; another auxiliary requirement could be that the computation is assisted by one of the SCaaS servers.

In this way, the set of information provided by the initiating party in a secure set intersection computation involving two parties such as an airline and a law enforcement agency may include one or more parameters defining the secure set intersection computation itself. The SCaaS (cloud) infrastructure (denoted as S) (e.g., computing device 10) takes such requirements (e.g., the set of information) and may automatically generate per-user/party software packages, e.g., executables, Docker container images, virtual machines, or any combination thereof) that may implement the required secure computation, and interface to the other users/parties. Such software packages may be generated automatically. The software packages may be generated in a verified manner, or in such a way that the software packages have minimal required additional code to reduce its memory footprint and improve its running speed (i.e., it is a package with all the libraries and supporting functions it needs in a unicontainer). In some examples, based on the set of information, computing device 10 may generate a first software package corresponding to the initiating party and a second software package corresponding to the additional party designated by the initiating party. For example, if the law enforcement agency is the initiating party, computing device 10 may generate the first software package corresponding to the law enforcement agency and generate the second software package corresponding to the airline. Alternatively, if the airline is the initiating party, computing device 10 may generate the first software package corresponding to the airline and generate the second software package corresponding to the law enforcement agency.

The per-party software packages may then be sent to each of the two parties, P1 and P2. In turn, the parties load the software packages in virtual (or physical) infrastructure (e.g., first party device 12 and second party device 14) configured to run the software packages. Each party, P1 and P2, receives a package that is digitally signed by SCaaS provider, S, (e.g., computing device 10) and this signature can be verified. This way, P1 and P2 may be able to verify they are receiving the software they are supposed to receive and run. In other words, computing device 10 may export the first software package to first party device 12 and export the second software package to second party device 14, enabling first party device 12 and second party device 14 to perform the secure set intersection computation using the sets of data controlled by the airline and the law enforcement agency.

Each of P1 and P2 loads the software package in its infrastructure and executes it. The secure computation proceeds between the software packages deployed on P1 and P2 computing infrastructures. Put another way, first party device 12 and second party device 14 may receive the first software package and the second software package, respectively, and load the software packages such that party devices 12, 14 can run the software packages.

In some examples, once the secure computation is completed, the output of computation of the set intersection is revealed only to the law enforcement agency. For example, the output may be is delivered to the law enforcement agency, while nothing is revealed to the airline. Additionally, in some examples, once the secure computation is completed, the output of computation of the set intersection is revealed only to the airline. For example, the output may be is delivered to the airline, while nothing is revealed to the law enforcement agency. Additionally, in some examples, once the secure computation is completed, the output of the secure computation is revealed to both the airline and the law enforcement agency.

In some examples, computing device 10 may implement SCaaS to search a cryptocurrency analysis/reputation database. For example, a law enforcement agency, another government agency (e.g., the internal revenue service (IRS)), or a private commercial entity (e.g., a financial institution) representing a first party (P1) may look up analysis results, or a reputation, computed for certain cryptocurrency addresses associated with some current or future users of the first party (e.g., one or more users associated with a smart contract). It may be desirable to protect customer information including, for example, an exact cryptocurrency wallet address and not to reveal the customer information to a second party (P2) that analyzes, and possibly builds reputations, for addresses associated with the respective cryptocurrency.

Such a secure computation for searching a cryptocurrency analysis/reputation database may include a set intersection with information retrieval. For example, the first party may assemble a set of cryptocurrency addresses that the first party is interested in obtaining analysis (or reputations) for (e.g., given by a first set of data set1). The second party may store a set of data including a set of cryptocurrency addresses that analyzed (and possibly built reputations for) by the second party (e.g., given by a second set of data set2). Once the first party obtains the indices of the addresses in set1 with respect to set2, the first party can run a private information retrieval (PIR) protocol to obtain the entire analysis results (and/or reputation profile) of the addresses in set1. The PIR step can also be cast as a computation to be performed using the SCaaS system (e.g., computing device 10). In this case, the overall computation is a composition of set intersection and PIR.

In some examples, computing device 10 may enable two or more parties to share cybersecurity monitoring/attack information. In such examples, two or more commercial entities (e.g., financial institutions), and/or law enforcement (or other government) agencies, would like to share cyber-monitoring information (e.g., network logs and system logs) to gain better visibility regarding an attack or a risk activity. For example, there may be a coordinated cyber campaign that is targeting multiple commercial entities and using some slow stealthy attack traffic; when results of monitoring network traffic of multiple entities are combined such a slow pattern can be detected, because suddenly a certain traffic pattern (e.g., from a specific system or targeting a specific service) is detected in the networks of the different entities. For example, computing device 10 may generate software packages enabling two or more parties to perform a secure computation including a set intersection, an approximate pattern matching, a search problem, or any combination thereof.

In some examples, computing device 10 may enable two or more parties to perform a secure computation to search medical data. For example, a first party (P1) may represent a researcher or a company conducting research in the medical field. The first party may seek to run data analytics, perform biostatistics studies, perform statistical computations, or perform big data queries, on a set of medical data. The set of medical data may, in some cases, be controlled or stored by a second party (P2) representing a hospital, a care provider, a company conducting genomic analyses, or an entity that handles medical data. Due to the sensitivity of the set of medical data, privacy regulations, or privacy agreements, the second party may be restricted from revealing at least a subset of the set of medical data. As such, computing device 10 may implement SCaaS to enable the first party and the second party the to perform a secure computation using the set of medical data, without revealing at least a subset of the set of medical data to the first party. In some examples, SCaaS ensures that only the output of the secure computation is revealed to the first party, without a revelation of any data that is not a part of the output. The secure computation may include statistical analyses (e.g., logistic regressions, maximum likelihood estimations, correlations), a high-dimensional optimization algorithm, the training phase of a machine learning algorithm, genome-wise associations, next-generation sequencing algorithms, genotype aggregation, big data analyses, or any combination thereof. In some examples, the secure computation may also include a set intersection between alleles present in a set of data associated with the first party, and a set of data associated with the second party. This set intersection may also be followed by private information retrieval (PIR), restricting the second party from accessing the output of the secure computation. Computing device 10 may implement SCaaS to enable the first party and the second party to mutually select one or more secure computation types to perform. Computing device 10 may generate software packages for performing the secure computation and export the software packages to the first party and the second party. Upon reception of software packages from computing device 10, the first party and the second party may deploy the software packages in computer infrastructure, interface the software packages with the first set of data and the second set of data, and execute the software packages. The output of the secure computation may only be revealed to the party (or parties) that are supposed to receive the output.

In one example, a system (e.g., computing device 10) enables secure distributed computation on one or more external systems without revealing the data to the external systems by preparing a secure software packages implementing the computation and interfacing the software packages with an external system. The software packages can be generated automatically and can also be digitally signed. In some examples, processing circuitry 22 of computing device 10 generates the software packages. For example, processing circuitry 22 may generate the software packages using any combination of a library of software engines stored in storage device 24 and computer code supplied to computing device by party devices 12, 14, 16. The software packages may also be generated in a verified manner, or in such a way that the software packages have minimal required additional code to reduce a memory footprint and improve a running speed of the software packages. In some examples, the software packages may include Docker container images, images in other similar frameworks, virtual machines, or any combination thereof.

Secure computations can be a performed on one or more external systems using either peer-to-peer protocol or through a server. The secure computations to be done can be either built in or user supplied program/code which is converted by the system into a secure computation program. The system can also reveal the output of the computation to certain external systems as specified by a user. The system can further include one or more options including but not limited to what should the system protect against (e.g., eavesdropping, modification of software of participating users/parties, etc.), and what should the system favor security or performance.

Once computing device 10 generates the software packages, the software packages may be sent to each external system (e.g., party device 12, 14, 16), which loads the software packages into a program configured to run the software packages. Once the secure computation is completed, the output of the secure computation can be revealed to the external systems specified by a user.

Figure 3:
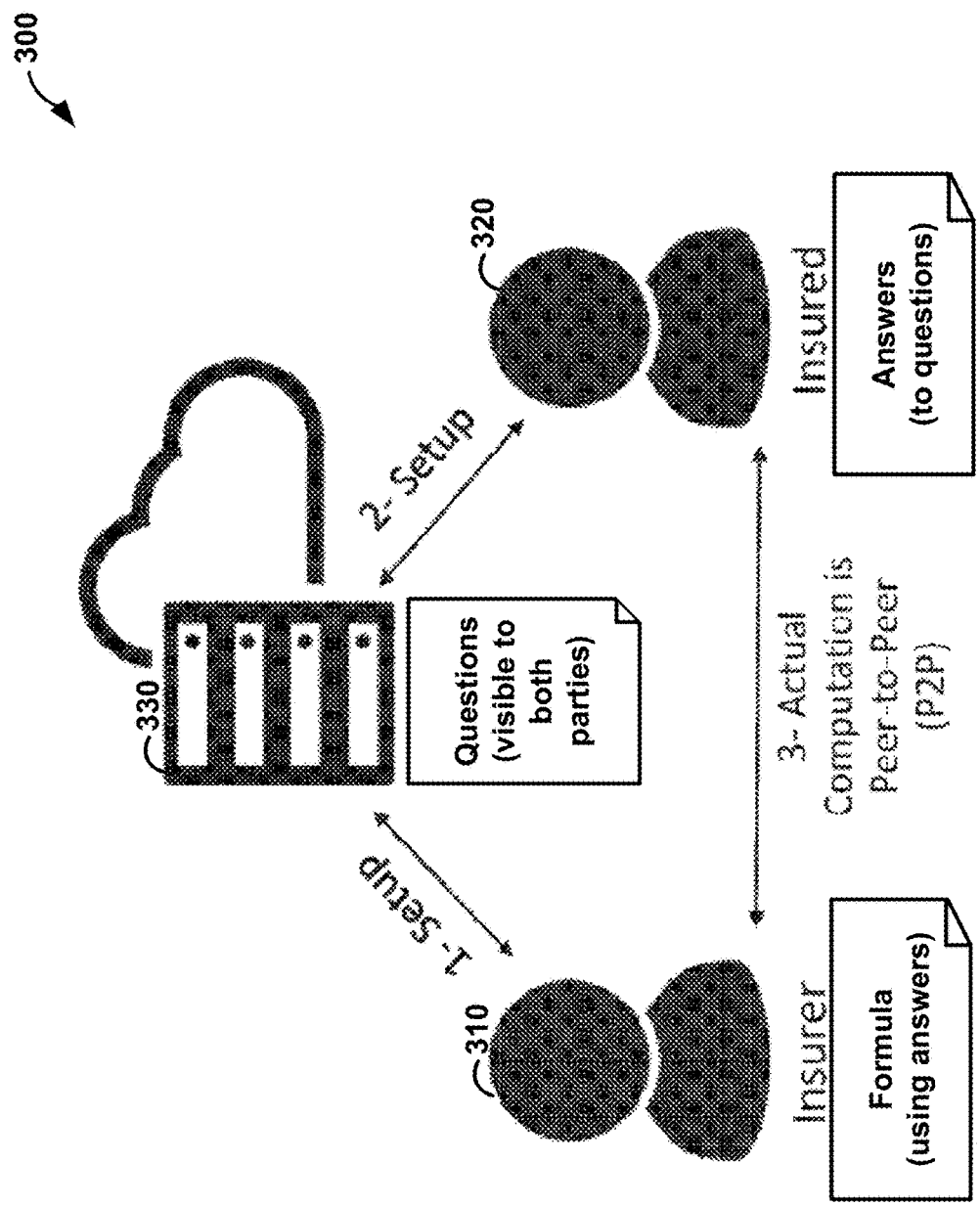
FIG. 3 is a block diagram illustrating an example system for performing a secure computation between an insurance provider and a customer, in accordance with one or more techniques described herein.

FIG. 3 is a block diagram illustrating an example system 300 for performing a secure computation between an insurance provider 310 and a customer 320, in accordance with one or more techniques described herein. As seen in FIG. 3, the secure computation may be facilitated by SCaaS server 330. SCaaS server 330 may be an example of computing device 10 of FIGS. 1-2. Additionally, insurance provider 310 may be an example of a first party associated with first party device 12 of FIGS. 1-2 and the customer 320 may be an example of a second party associated with second party device 14 of FIGS. 1-2.

In some examples, insurance provider 310 may use SCaaS server 330 to determine a risk score associated with customer 320. For example, insurance provider 310 may prepare a set of questions to be answered by customer 320, where the risk score may be determined based on the answers to the set of questions provided by customer 320. The set of questions may, in some examples, include personal questions such as "do you consume tobacco?," "what is your date of birth?," or "do you perform more than one building, antenna, span, and earth (BASE) jump per year?" Since answers to the set of questions may include personal information, SCaaS server 330 may design a secure computation such that insurance provider 310 may obtain the risk score—without obtaining specific answers to the set of questions provided by customer 320.

For example, insurance provider 310 may prepare the list of questions and design the formula that produces the risk factor based on the set of questions. SCaaS server 220 may receive a set of information including the set of questions and the formula and prepare a first software package corresponding to insurance provider 310 and a second software package corresponding to customer 320. Subsequently, SCaaS server 330 may export the first software package to a first device (e.g., first party device 12 of FIGS. 1-2) associated with insurance provider 310 and export the second software package to a second device (e.g., second party device 14 of FIGS. 1-2) associated with customer 320. Subsequently, first party device 12 and second party device 14 may perform the secure computation such that insurance provider 310 obtains the risk score associated with customer 320—without revealing the answers provided by customer 320 to insurance provider 310.

In some examples, SCaaS server 330 designs the secure computation such that the formula used to calculate the risk score is private to insurance provider 310, the answers to the list of questions is private to customer 320. In some examples, only insurance provider 310 obtains the risk score. In some examples, the list of questions may include up to 1,000 questions. In some examples, the customer 320 is one customer of a plurality of customers that answer the list of questions for the purpose of insurance provider 310 obtaining a risk score. In some examples, the secure computation of FIG. 3 may take less than ten seconds to complete after the answers to the list of questions are submitted by customer 320. In some examples, devices associated with insurance provider 310 and customer 320 perform the secure computation without assistance from SCaaS server 330. Additionally, in some examples, devices associated with insurance provider 310 and customer 320 perform the secure computation with assistance from SCaaS server 330.

In some examples, to perform the secure computation, an information exchange occurs between insurance provider 310 and customer 320. The information exchange, in some cases, does not include the answers to the set of questions (even in encrypted form). Rather, the information exchanged may be random to any observer. To initiate the secure computation, the insurance provider 310 may set up the operation using SCaaS (enter questions document, e.g., Word, Excel, or HTML/XML, or DB, and enter details of customer 320). Insurance provider 310 may download the secure computation software (e.g., a first software package) prepared by SCaaS server 330 for the secure computation. Subsequently, SCaaS server 330 or insurance provider 310 may send a log-in link to customer 320. Customer 320 may follow a link to register and download the secure computation software (e.g., a second software package) prepared by SCaaS server 330 for the secure computation.

The first software package and the second software package prepared by SCaaS server 330 may connect to devices associated with insurance provider 310 and customer 320 (P2P interaction). Insurance provider 310 may enter the formula, and customer 320 may start answering the questions. SCaaS server 330, in some examples, may be involved in the secure computation to decrease an amount of time required to complete the secure computation and save at an intermediate state to resume at a later time. After all questions are answered, insurance provider 310 may receive a result of the secure computation (e.g., risk score for customer 320), and customer 320 may also receive a commitment to the submitted by customer 320. Customer 320 may, in some examples, receive the result of the secure computation. In other examples, customer 320 may receive only a commitment to the answers, and an indication that the secure computation has been completed, without receiving the risk score.

Figure 4:
FIG. 4 is an example user interface illustrating a selection of a type of secure computation to be performed, in accordance with one or more techniques described herein.
Figure 4:
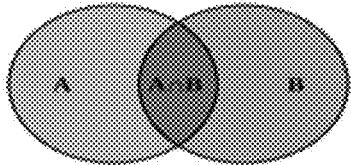
Figure 4:
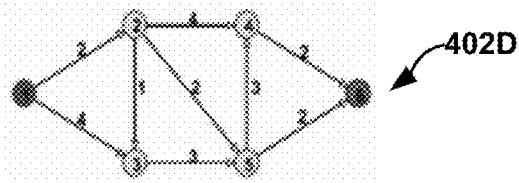
Figure 4:
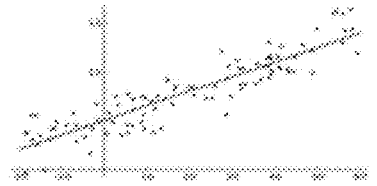
Figure 4:
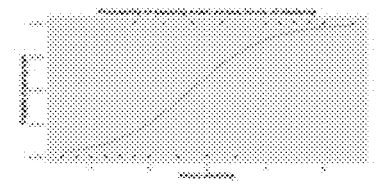

FIG. 4 is an example user interface 400 illustrating a selection of a type of secure computation to be performed, in accordance with one or more techniques described herein. User interface 400 may be associated with any of party devices 12, 14, 16 of FIGS. 1-2. As seen in FIG. 4, user interface 400 may include a display of a set of secure computation types 402A-402F (collectively, "secure computation types 402"). The display may enable a user selection of at least one of the secure computation types 402. Additionally, in the example of FIG. 4, user interface 400 includes next step button 404 which allows user interface 400 to accept a user input to change the display of user interface 400.

As discussed above with respect to FIGS. 1-2, computing device 10 may receive a set of information including one or more parameters defining a secure computation, and computing device 10 may generate software packages enabling any combination of party devices 12, 14, and 16 to perform the secure computation. The set of information, in some cases may include an indication of a type of secure computation to be performed. In some examples, storage device 24 stores a list of secure computation types (e.g., secure computation types 402), and outputs the list of secure computation devices to first party device 12 for display on a user interface (e.g., user interface 400). In this way, first party device 12 may receive a user selection from the set of secure computation types 402 and transmit the user selection to computing device 10 as a part of the set of information. Additionally, in some cases, storage device 24 may also store a software engine corresponding to each of secure computation types 402.

The set of secure computation types 402 may include a list of different computations that may be performed to produce an output using two or more sets of input data corresponding to two or more respective parties. Secure computation type 402A, for example, represents a polynomial evaluation. Additionally, secure computation type 402B represents a secure pattern matching computation, secure computation type 402C represents a set intersection computation, secure computation type 402D represents a path evaluation computation, secure computation type 402E represents a linear regression computation, and secure computation 402F represents a logistic regression computation. As seen in FIG. 4, secure computation type 402E (i.e., the "linear regression" computation) is selected. For example, the bubble next to the "linear regression" header is filled in, indicating that secure computation type 402E is selected. In some examples, user interface 400 represents a screen of a consumer electronic device (e.g., a smart phone, a tablet device, or a computer monitor). Additionally, in some cases, user interface 400 may represent a touch screen, enabling a user to select secure computation types 402 by touching user interface 400.

Next step button 404 may enable user interface 400 to receive an indication that the selection of secure computation types 402 is complete (e.g., a user may press next step button 404 to indicate that the selection is complete). After receiving the indication that the selection of secure computation types 402 is complete, user interface 400 may update to display another set of options (e.g., a list of data types, a prompt asking whether computing device 10 is authorized to participate in the secure computation, or a list of security guarantees). In this way, by displaying options on user interface 400, a party device (e.g., any of party devices 12, 14, 16) may be configured to receive user input for compiling the set of information to send to computing device 10 so that computing device 10 can generate software packages for performing the secure computation. In some examples, computing device 10 may generate the software packages using respective software engines stored in storage device 24. In other words, storage device 24 may store a library of software engines, where at least one software engine corresponds to each of secure computation types 402, and each other selection made via user interface 400. Based on user input to user interface 400, computing device may generate the software packages using the library of software engines.

Figure 5A:
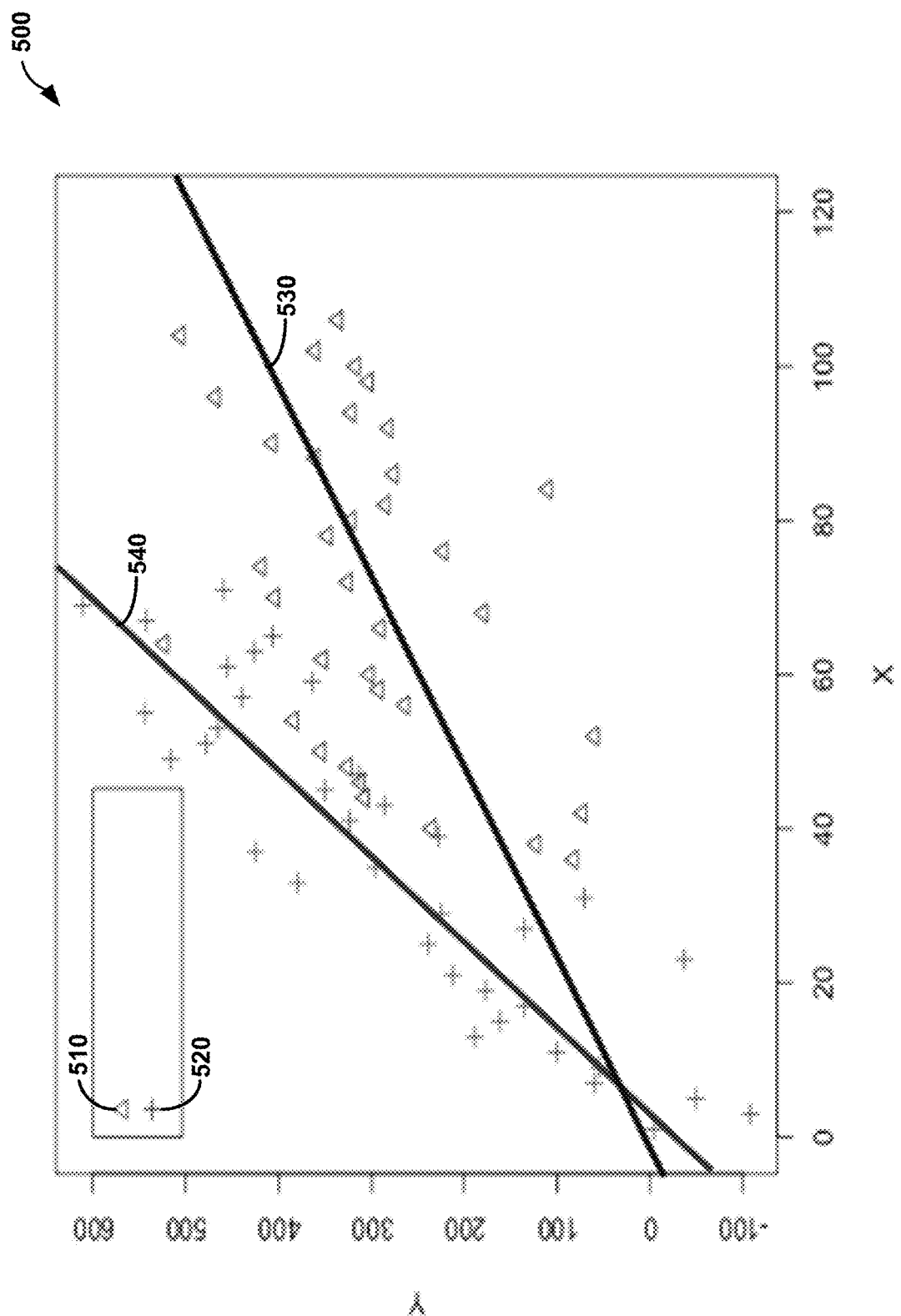
FIG. 5A is a graph illustrating a data plot, in accordance with one or more techniques of this disclosure.
Figure 5B:
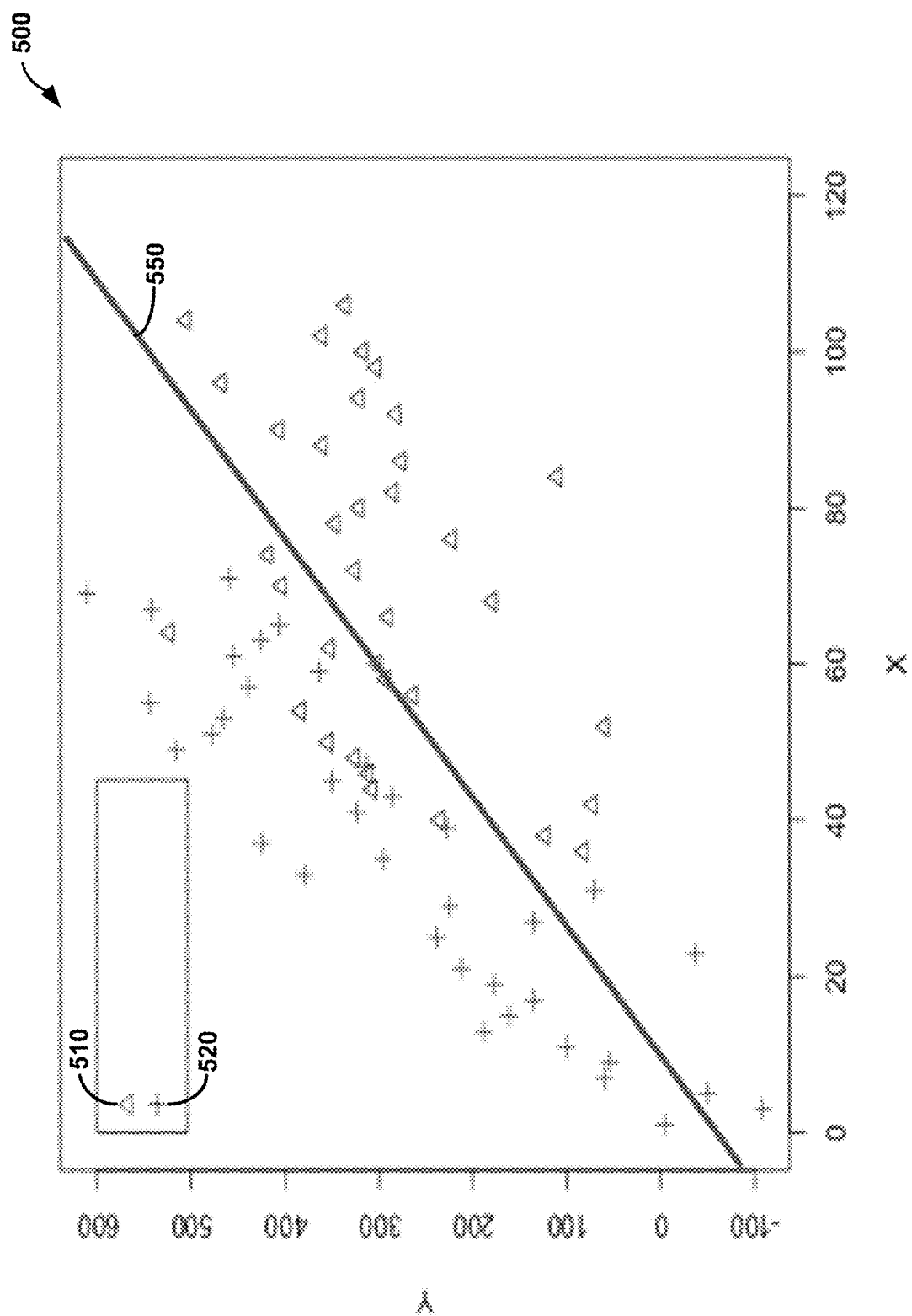
FIG. 5B is a graph illustrating data plot including a linear model that represents an output of a linear regression secure computation, in accordance with one or more techniques of this disclosure.

FIGS. 5A and 5B illustrate two graphs that demonstrate an example secure computation that may be performed according to system 2 of FIGS. 1-2. More specifically, FIGS. 5A and 5B illustrate linear regression computations based on two sets of data corresponding to two respective parties.

FIG. 5A is a graph illustrating a data plot 500, in accordance with one or more techniques of this disclosure. As seen in FIG. 5A, data plot 500 includes a first set of data 510, a second set of data 520, a first linear model 530, and a second linear model 540. In some examples, first linear model 530 may represent a linear best-fit curve corresponding to the first set of data 510. Additionally, second linear model 540 may represent a linear best-fit curve corresponding to the second set of data 520. In some examples, the first set of data 510 may be associate with a first party and second set of data 520 may be associated with a second party. In some examples, the first set of data 510 and the second set of data 520 may include sensitive information, and it may be beneficial to conceal at least a subset of the first set of data 510 from the second party and conceal at least a subset of the second set of data 520 from the first party.

FIG. 5B is a graph illustrating data plot 500 including a linear model 550 that represents an output of a linear regression secure computation, in accordance with one or more techniques of this disclosure. FIG. 5B includes the first set of data 520 and the second set of data 520 that are also illustrated in FIG. 5A. Additionally, FIG. 5B includes linear model 550 which represents a linear best-fit curve corresponding to both of the first set of data 510 and the second set of data 520. In this way, linear model 550 may represent an output of a secure computation which uses the first set of data 510 and the second set of data 520 as inputs, where the first set of data 510 is associated with a first party corresponding to first party device 12 and the second set of data 520 is associated with a second party corresponding to second party device 14. In some examples, the secure computation represented by FIGS. 5A and 5B may be performed by first party device 12 and second party device 14 using a first software package and a second software package produced by computing device 10. The first software package and the second software package may enable first party device 12 and second party device 14 to exchange the first set of data 510 and the second set of data 510 over a communication link between the first party device 12 and the second party device 14. Subsequently, first party device 12 and second party device 14 may perform the secure computation to obtain linear model 550. The output, linear model 550, may in turn be accessed by any of a list of devices that were specified in the set of information used to create the first software package and the second software package.

Figure 6:
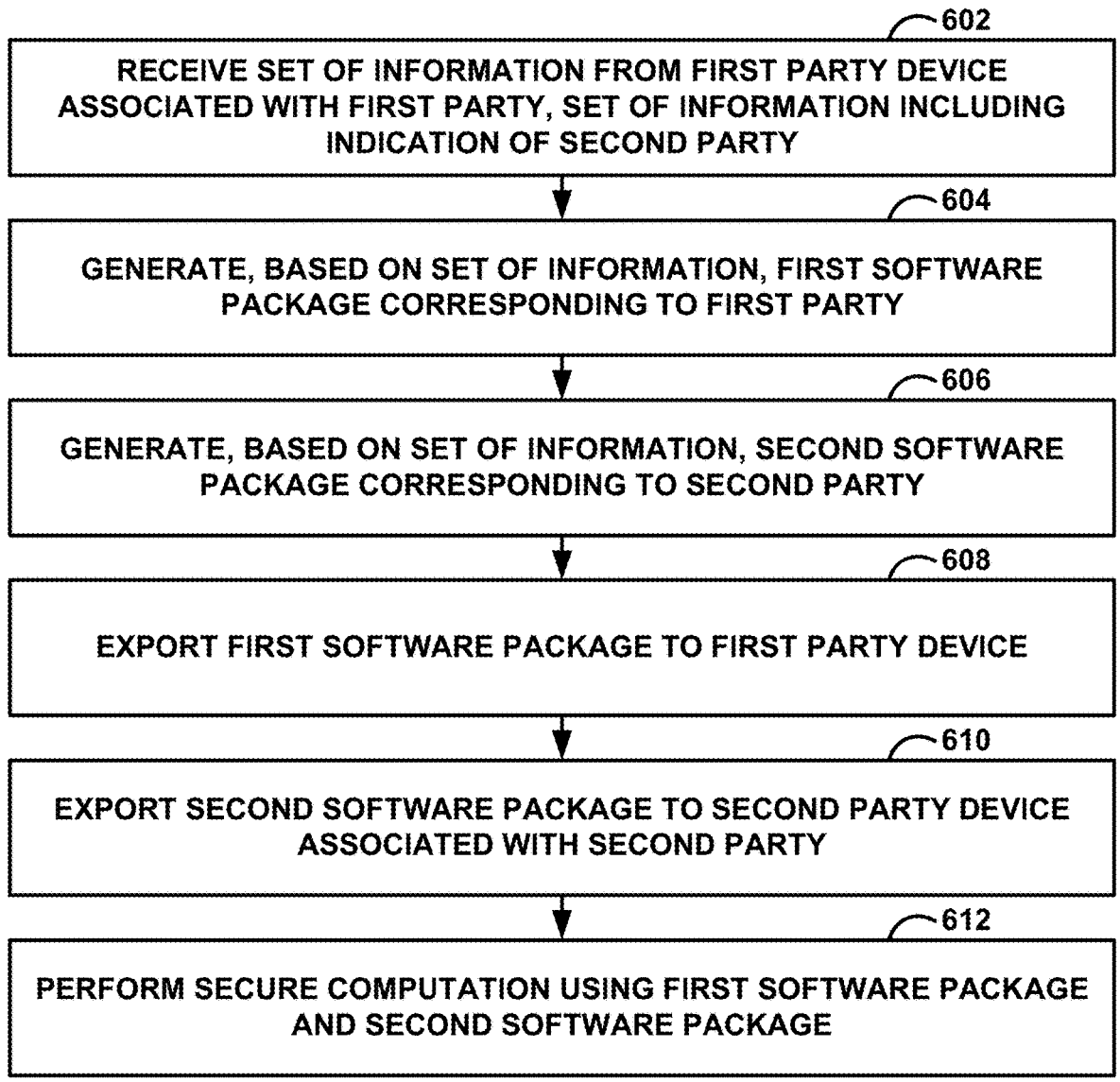
FIG. 6 is a flow diagram illustrating an example operation for generating software packages for performing a secure computation, in accordance with one or more techniques of this disclosure.

FIG. 6 is a flow diagram illustrating an example operation for generating software packages for performing a secure computation, in accordance with one or more techniques of this disclosure. For convenience, FIG. 6 is described with respect to computing device 10, first party device 12, second party device 14, and third party device 16 of FIGS. 1-2. However, the techniques of FIG. 6 may be performed by different components of computing device 10, first party device 12, second party device 14, and third party device 16 or by additional or alternative devices.

Computing device 10, in some cases, may be configured to automatically generate a set of software packages in order to provide SCaaS to two or more parties, enabling the two or more parties to perform a secure computation using the set of software packages to produce an output.

In some examples, computing device 10 receives a set of information from first party device 12 associated with a first party, the set of information including an indication of a second party (602). In some examples, the set of information further includes any combination of an indication that the first party and the second party are to be involved in the secure computation, a format of a first set of data associated with the first party, a format of a second set of data associated with the second party, a type of secure computation to be performed, a list of devices that are authorized to access the output, one or more security provisions to be included in the secure computation, and an indication of whether the processing circuitry is authorized to assist in performing the secure computation. As such, the set of information may include a list of parameters defining a secure computation, where computing device 10 may be configured to create software to implement the secure computation based on the set of information. Additionally, the set of information may enable a selection of whether to prioritize decreasing an amount of time required to perform the secure computation or to prioritize increasing a security level of the secure computation. For example, if computing device 10 is authorized to participate in the secure computation, an amount of time required to perform the secure computation may be decreased.

After computing device 10 receives the set of information, computing device 10 may generate, based on the set of information, a first software package corresponding to the first party (604) and generate, based on the set of information, a second software package corresponding to the second party (606). In some examples, the first software package and the second software package may include a Docker container image, images in other similar frameworks, virtual machines, or any combination thereof. Since the first software package and the second software package are generated based on the set of information, the software packages may reflect one or more aspects of the set of information. For example, the set of information may include an indication of a format of input data. Computing device 10 may generate the software packages to correctly interface with the input data, for example.

Computing device 10 may export the first software package to first party device 12 (608) and export the second software package to second party device 14 (610). Computing device 10 may export the first software package and the second software package over communication link 34A and communication link 34B, respectively. In the example of FIG. 6, exporting the software packages may enable first party device 12 and second party device 14 to perform a secure computation using the first software package and the second software package (612). Although the example operation of FIG. 6 is described with respect to two parties, computing device 10 may, in some cases, enable more than two parties to engage in a secure computation.

Figure 7:
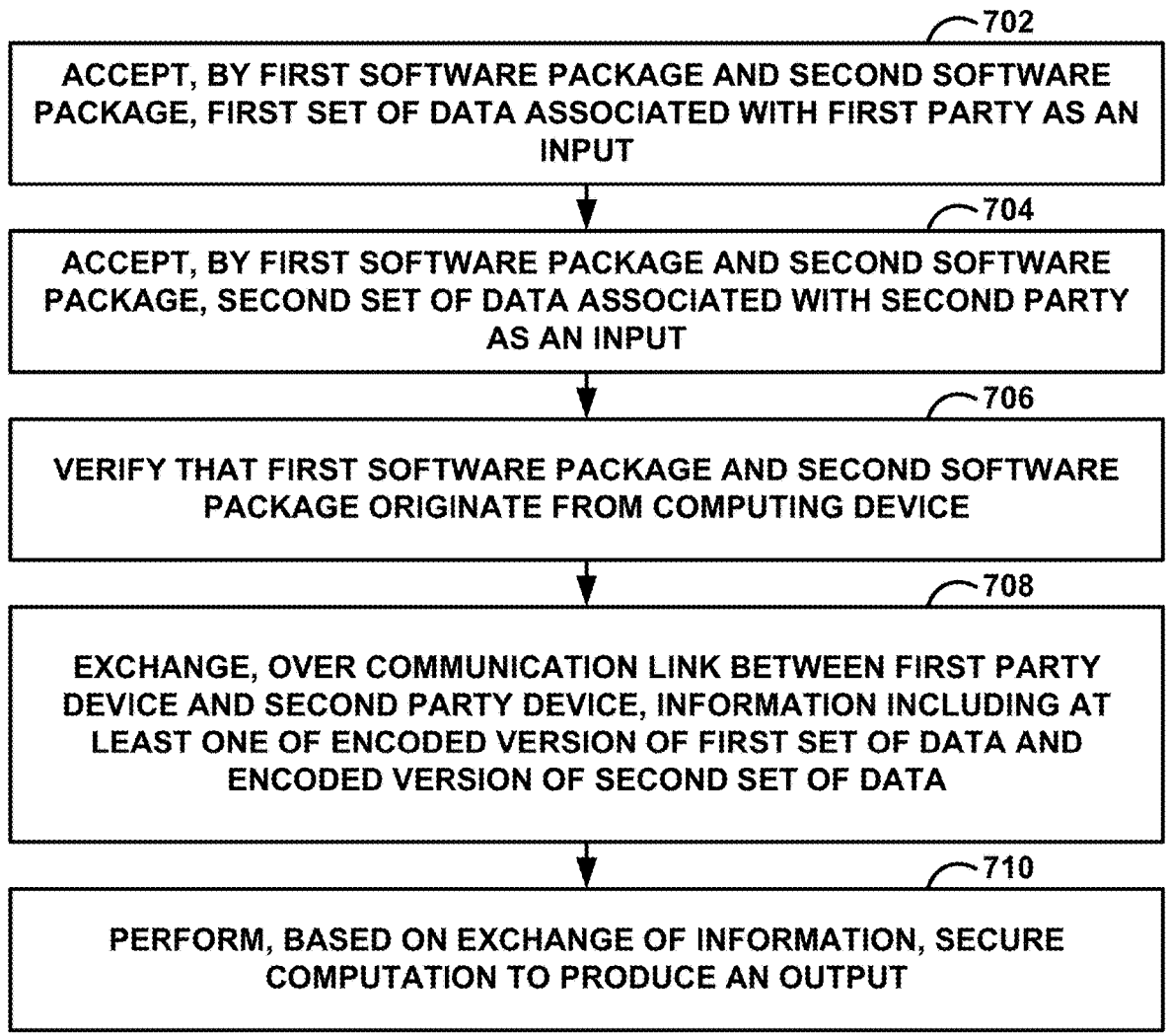
FIG. 7 is a flow diagram illustrating an example operation for performing a secure computation using two or more devices, in accordance with one or more techniques of this disclosure.

FIG. 7 is a flow diagram illustrating an example operation for performing a secure computation using two or more devices, in accordance with one or more techniques of this disclosure. For convenience, FIG. 7 is described with respect to computing device 10, first party device 12, second party device 14, and third party device 16 of FIGS. 1-2. However, the techniques of FIG. 7 may be performed by different components of computing device 10, first party device 12, second party device 14, and third party device 16 or by additional or alternative devices.

Computing device 10, in some cases, may be configured to automatically generate a set of software packages in order to provide SCaaS to two or more parties, enabling the two or more parties to perform a secure computation using the set of software packages to produce an output. After receiving the software packages, the two or more parties may install the software packages and execute the software packages to perform the secure computation.

In some examples first party device 12 and second party device 14 perform a secure computation using a first software package and a second software package. The first software package and the second software package are configured to accept a first set of data associated with a first party as an input (702) and accept a second set of data set of data associated with a second party as an input (704). For example, computing device 10 may create the first software package and the second software package such that the software packages accept the input data. Additionally, first party device 12 and second party device 14 may verify that the first software package and the second software package originate from computing device 10 (706). For example, when generating the software packages, computing device 10 may generate a first signature corresponding to the first software package and generate a second signature corresponding to the second software package. Subsequently, computing device 10 is configured to export the first signature to the first party device 12 with the first software package, allowing the first party device 12 to verify that the first software package originates from computing device 10 and export the second signature to the second party device 14 with the second software package, allowing the second party device 14 to verify that the second software package originates from the computing device 10.

After verifying that the first software package and the second software package originate from computing device 10, first party device 12 and second party device 14 may exchange, over communication link 32A, information including at least one of an encoded version of the first set of data and an encoded version of the second set of data (708). Subsequently, first party device 12 and second party device 14 may perform, based on the exchange of information, a secure computation to produce an output (710). The first set of data and the second set of data may, in some cases, represent sensitive information. As such, there may be no revelation of at least a subset of the second set of data to the first party and no revelation of at least a subset of the first set of data to the second party. Although the example operation of FIG. 6 is described with respect to two parties, computing device 10 may, in some cases, enable more than two parties to engage in a secure computation.

This disclosure describes devices, systems, and techniques with reference to one or more examples. However, this disclosure covers all modifications, equivalents, and alternatives of the devices, systems, and techniques that are consistent with this disclosure. One or more details are set forth, such as number of steps, order of steps, number of parties, type of computation to be performed, type of computer or device to perform computation, particular use case, type of infrastructure, software specific documentation (e.g., Microsoft Excel and Microsoft Word). In some examples, the techniques of this disclosure can be practiced without these details. Thus, the details set forth are merely exemplary. Also, the features implemented in one embodiment may be implemented in another embodiment where logically possible. The details can be varied from and still be contemplated to be within the spirit and scope of the present design.

The techniques described in this disclosure may be implemented, at least in part, in hardware, software, firmware or any combination thereof. For example, various aspects of the described techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include RAM, read only memory (ROM), programmable read only memory (PROM), EPROM, EEPROM, flash memory, a hard disk, a CD-ROM, a floppy disk, a cassette, magnetic media, optical media, or other computer readable media.

What is claimed is:

1. A computing device for automatically generating software packages to provide Secure Computation as a Service (SCaaS), the computing device comprising processing circuitry electrically coupled to a storage device, wherein the processing circuitry is configured to:
   receive a set of information comprising an indication of a first party and an indication of a second party;
   generate, based on the set of information, a first software package corresponding to the first party, the first software package configured to implement a secure computation;
   generate, based on the set of information, a second software package corresponding to the second party, the second software package configured to implement the secure computation;
   export the first software package to a first party device associated with the first party; and
   export the second software package to a second party device associated with the second party, enabling the first party device and the second party device to perform the secure computation using the first software package and the second software package,
   wherein to perform the secure computation, the first software package and the second software package are configured to:
   accept as an input a first set of data associated with the first party;
   accept as an input a second set of data associated with the second party; and
   enable the first party device and the second party device to:
      exchange, over a communication link between the first party device and the second party device, information including at least one of an encoded version of the first set of data and an encoded version of the second set of data, and
      wherein there is no revelation of at least a subset of the second set of data to the first party and no revelation of at least a subset of the first set of data to the second party.

2. The computing device of claim 1, wherein the processing circuitry is further configured to:
   generate a first signature corresponding to the first software package;
   generate a second signature corresponding to the second software package;
   export the first signature to the first party device with the first software package, allowing the first party device to verify that the first software package originates from the processing circuitry of the computing device; and
   export the second signature to the second party with the second software package, allowing the second party device to verify that the second software package originates from the processing circuitry of the computing device.

3. The computing device of claim 1, wherein the set of information further comprises:
   information indicative of a selection of one or more steps, wherein the one or more steps are steps of the secure computation;
   information indicative of at least one of:
      a format of the first set of data; and
      a format of the second set of data;
   information indicative of an output to be produced by the secure computation; and
   information indicative of a selection of one or more devices, wherein based on the selection, the first software package and the second software package are configured to enable at least one of the one or more devices to access the output.

4. The computing device of claim 3, wherein the secure computation comprises at least one of:
   an intersection computation between the first set of data and the second set of data, wherein the output comprises an intersection data set resulting from the intersection computation;
   a linear regression computation based on the first set of data and the second set of data, wherein the output comprises a linear model resulting from the linear regression computation; and
   a pattern matching computation based on the first set of data and the second set of data, wherein the output comprises a pattern resulting from the pattern matching computation.

5. The computing device of claim 3, wherein the set of information received by the processing circuitry further includes software representative of at least one step of the secure computation, and wherein the information indicative of the selection of the one or more steps includes a selection from the at least one step included in the software.

6. The computing device of claim 3, wherein the information indicative of the selection of the one or more steps represents a user selection from a set of steps stored in the storage device.

7. The computing device of claim 1, wherein the set of information further comprises:
   one or more security provisions to be included in the first software package and the second software package; and
   an indication of whether the processing circuitry is authorized to assist in performing the secure computation.

8. The computing device of claim 7, wherein based on the processing circuitry being authorized to assist in performing the secure computation, the first software package and the second software package are further configured to enable the first party device and the second party device to:
   exchange at least one of the encoded version of the first set of data and the encoded version of the second set of data with the computing device,
   wherein there is no revelation of at least a subset of the first set of data to the computing device and no revelation of at least a subset of the second set of data to the computing device, and wherein to assist in performing the secure computation, the computing device is configured to:
   generate one or more random parameters in order to decrease an amount of time required to perform the secure computation.

9. The computing device of claim 7, wherein based on the processing circuitry being authorized to assist in performing the secure computation, the processing circuitry is configured to:
   generate a set of random data;
   export a first subset of the set of random data to the first party device; and
   export a second subset of the set of random data to the second party device, wherein the first subset and the second subset enable the first party device and the second party device to decrease an amount of time required to perform the secure computation.

10. The computing device of claim 1, wherein the secure computation is a first secure computation, wherein the communication link is a first communication link, wherein the set of information further comprises an indication of a third party, and wherein the processing circuitry is further configured to:

generate, based on the set of information, a third software package corresponding to the third party; and export the third software package to a third party device associated with the third party, enabling the first party device, the second party device, and the third party device to perform a second secure computation using the first software package, the second software package, and the third software package, wherein to perform the second secure computation, the first software package, the second software package, and the third software package are configured to:

accept as an input a third set of data associated with the third party device, and enable the first party device, the second party device, and the third party device to:

exchange, over the first communication link, a second communication link between the first party device and the third party device, and a third communication link between the second party device and the third party device, information including at least one of the encoded version of the first set of data, the encoded version of the second set of data, and an encoded version of the third set of data, wherein there is no revelation of at least a subset of the second set of data and at least a subset of the third set of data to the first party, wherein there is no revelation of at least a subset of the first set of data and at least a subset of the third set of data to the second party, and wherein there is no revelation of at least a subset of the first set of data and at least a subset of the second set of data to the third party.

11. The computing device of claim 10, wherein the set of information further comprises an indication of at least one additional party, and wherein the processing circuitry is further configured to:

generate, based on the set of information, an additional software package corresponding to each additional party of the at least one additional party; and export each additional software package to a respective additional party, enabling the first party device, the second party device, the third party device, and devices corresponding to the at least one additional party to perform a third secure computation using the first software package, the second software package, the third software package, and each additional software package.

12. The computing device of claim 1, wherein the first software package comprises any combination of executables, containers, and virtual machines (VMs), and wherein the second software package comprises any combination of executables, containers, and VMs.

13. The computing device of claim 1, wherein the first party and the second party comprise any combination of a law enforcement agency, a transportation company, a financial institution, a user associated with a smart contract, a user associated with a software agent, a medical facility, and a company performing research using medical data.

14. The computing device of claim 1, wherein to perform the secure computation, the first software package and the second software package are configured to enable the first party device and the second party device to apply a sequence of mathematical functions to produce the output.

15. A method comprising:

receiving, by processing circuitry of a computing device for automatically generating software packages to provide Secure Computation as a Service (SCaaS), a set of information comprising an indication of a first party and an indication of a second party;

generating, based on the set of information, a first software package corresponding to the first party, the first software package configured to implement a secure computation;

generating, based on the set of information, a second software package corresponding to the second party, the second software package configured to implement the secure computation;

exporting the first software package to a first party device associated with the first party; and exporting the second software package to a second party device associated with the second party, enabling the first party device and the second party device to perform the secure computation using the first software package and the second software package, wherein to perform the secure computation, the method further comprises:

accepting, by the first software package and the second software package, a first set of data associated with the first party as an input;

accepting, by the first software package and the second software package, a second set of data associated with the second party as an input; and exchanging, over a communication link between the first party device and the second party device, information including at least one of an encoded version of the first set of data and an encoded version of the second set of data, wherein there is no revelation of at least a subset of the second set of data to the first party and no revelation of at least a subset of the first set of data to the second party.

16. The method of claim 15, further comprising:

generating a first signature corresponding to the first software package;

generating a second signature corresponding to the second software package;

exporting the first signature to the first party device with the first software package, allowing the first party device to verify that the first software package originates from the processing circuitry of the computing device; and exporting the second signature to the second party with the second software package, allowing the second party device to verify that the second software package originates from the processing circuitry of the computing device.

17. The method of claim 15, wherein the set of information further comprises:

information indicative of a selection of one or more steps, wherein the one or more steps are steps of the secure computation;

information indicative of at least one of:
a format of the first set of data; and
a format of the second set of data;

information indicative of an output to be produced by the secure computation; and information indicative of a selection of one or more devices, wherein based on the selection, the first software package and the second software package are configured to enable at least one of the one or more devices to access the output.

18. The method of claim 15, wherein the set of information further comprises:
one or more security provisions to be included in the first software package and the second software package; and
an indication of whether the processing circuitry is authorized to assist in performing the secure computation.

19. The method of claim 15, wherein the secure computation is a first secure computation, wherein the communication link is a first communication link, wherein the set of information further comprises an indication of a third party, and wherein the method further comprises:
generating, based on the set of information, a third software package corresponding to the third party; and
exporting the third software package to a third party device associated with the third party, enabling the first party device, the second party device, and the third party device to perform a second secure computation using the first software package, the second software package, and the third software package,
wherein to perform the second secure computation, the method further comprises:
accepting, by the first software package, the second software package, and the third software package, a third set of data associated with the third party device as an input, and
exchanging, over the first communication link, a second communication link between the first party device and the third party device, and a third communication link between the second party device and the third party device, information including at least one of the encoded version of the first set of data, the encoded version of the second set of data, and an encoded version of the third set of data,
wherein there is no revelation of at least a subset of the second set of data and at least a subset of the third set of data to the first party, wherein there is no revelation of at least a subset of the first set of data and at least a subset of the third set of data to the second party, and wherein there is no revelation of at least a subset of the first set of data and at least a subset of the second set of data to the third party.

20. A computing device configured to automatically generate a set of software packages in order to provide Secure Computation as a Service (SCaaS) to two or more parties, enabling the two or more parties to perform a secure computation using the set of software packages to produce an output, wherein the computing device comprises processing circuitry electrically coupled to a storage device, the processing circuitry configured to:
receive a set of information including: an indication that a first party and a second party are to be involved in the secure computation, a format of a first set of data associated with the first party, a format of a second set of data associated with the second party, a type of secure computation to be performed, a list of devices that are authorized to access the output, one or more security provisions to be included in the secure computation, and an indication of whether the processing circuitry is authorized to assist in performing the secure computation, wherein the set of information enables a selection of whether to prioritize decreasing an amount of time required to perform the secure computation or to prioritize increasing a security level of the secure computation;
generate, based on set of information, a first software package corresponding to the first party, the first software package configured to implement the secure computation;
generate, based on set of information, a second software package corresponding to the second party, the second software package configured to implement the secure computation;
export the first software package to a first party device associated with the first party; and
export the second software package to a second party device associated with the second party, enabling the first party device and the second party device to perform the secure computation using the first software package and the second software package,
wherein to perform the secure computation, the first software package and the second software package are configured to:
accept as an input the first set of data associated with the first party;
accept as an input the second set of data associated with the second party; and
enable the first party device and the second party device to:
verify that the first software package and the second software package originate from the processing circuitry of the computing device,
exchange, over a communication link between the first party device and the second party device, information including at least one of an encoded version of the first set of data and an encoded version of the second set of data,
perform, based on the exchange of the information, the secure computation to produce the output, wherein there is no revelation of at least a subset of the second set of data to the first party and no revelation of at least a subset of the first set of data to the second party, and
gain access to the output based on the list of devices.

* * * * *